US010587711B2

(12) United States Patent
Fan

(10) Patent No.: US 10,587,711 B2
(45) Date of Patent: Mar. 10, 2020

(54) METHOD AND APPARATUS FOR PUSHING INFORMATION

(71) Applicant: Baidu Online Network Technology (Beijing) Co., Ltd., Beijing (CN)

(72) Inventor: Xuang Fan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 24 days.

(21) Appl. No.: 16/026,704

(22) Filed: Jul. 3, 2018

(65) Prior Publication Data

US 2019/0014185 A1 Jan. 10, 2019

(30) Foreign Application Priority Data

Jul. 4, 2017 (CN) .......................... 2017 1 0539116

(51) Int. Cl.
*H04L 29/08* (2006.01)
*H04W 4/021* (2018.01)

(52) U.S. Cl.
CPC .............. *H04L 67/26* (2013.01); *H04L 67/18* (2013.01); *H04L 67/306* (2013.01); *H04W 4/021* (2013.01)

(58) Field of Classification Search
CPC .................................................. H04W 4/021
See application file for complete search history.

(56) References Cited

U.S. PATENT DOCUMENTS

2018/0014161 A1 * 1/2018 Warren ................. H04W 4/021
2018/0189665 A1   7/2018 Zhang et al.

FOREIGN PATENT DOCUMENTS

| CN | 104965920 A | 10/2015 | | |
|---|---|---|---|---|
| CN | 106682015 A | 5/2017 | | |
| CN | 106844376 A | * | 6/2017 | |
| WO | WO-2018122588 A1 | * | 7/2018 | ............ G01S 5/02 |
| WO | WO-2018122816 A1 | * | 7/2018 | ............ G01S 5/02 |

* cited by examiner

*Primary Examiner* — Bryan Lee
(74) *Attorney, Agent, or Firm* — Seed IP Law Group LLP

(57) ABSTRACT

The present disclosure discloses a method and apparatus for pushing information. A specific embodiment of the method comprises: receiving geographic location information of a reference region sent by a terminal device; determining an Area of Interest (AOI) corresponding to the reference region on a map using the geographic location information of the reference region; dividing the AOI corresponding to the reference region into a plurality of candidate AOIs; statisticising respectively people flow information and Point of Interest (POI) information of each candidate AOI of the plurality of candidate AOIs; and selecting a candidate AOI as a target AOI from the plurality of candidate AOIs based on the people flow information and POI information of each candidate AOI, and pushing information of the target AOI to the terminal device. According to the embodiment, costs of acquiring information are reduced.

12 Claims, 3 Drawing Sheets

METHOD AND APPARATUS FOR PUSHING INFORMATION

CROSS-REFERENCE TO RELATED APPLICATIONS

This application is related to and claims priority from Chinese Application No. 201710539116.6, filed on Jul. 4, 2017 and entitled "Method and Apparatus for Pushing Information," the entire disclosure of which is hereby incorporated by reference.

TECHNICAL FIELD

The present disclosure relates to the field of computer technology, specifically to the field of Internet technology, and more specifically to a method and apparatus for pushing information.

BACKGROUND

In daily life, one often needs to select a suitable community from a large developing region and construct related facilities (e.g., shops, gyms, and senior homes) in the selected community. In the process of selecting community, the acquisition of a large amount of related information is usually required, for example, geographic location information, people flow information, and building information of each community.

The existing approach to acquire the information is mainly on-site investigation. However, the on-site investigation requires much manpower, resulting in higher costs of the information acquisition.

SUMMARY

The objective of the present disclosure is to provide an improved method and apparatus for pushing information to solve the technical problems mentioned in the foregoing background section.

In a first aspect, embodiments of the present disclosure provide a method for pushing information, the method including: receiving geographic location information of a reference region sent by a terminal device; determining an Area of Interest (AOI) corresponding to the reference region on a map using the geographic location information of the reference region; dividing the AOI corresponding to the reference region into a plurality of candidate AOIs; statisticising respectively people flow information and Point of Interest (POI) information of each candidate AOI of the plurality of candidate AOIs; and selecting a candidate AOI as a target AOI from the plurality of candidate AOIs based on the people flow information and the POI information of the each candidate AOI, and pushing information of the target AOI to the terminal device.

In some embodiments, the geographic location information of the reference region includes one set of geographic coordinates of the reference region and a radius of the reference region. The determining an Area of Interest (AOI) corresponding to the reference region on a map using the geographic location information of the reference region includes: finding a point indicated by the one set of geographic coordinates of the reference region on the map; and circling a circular AOI on the map with the point indicated by the one set of geographic coordinates of the reference region as a center of the circular AOI and with the radius of the reference region as a radius of the circular AOI, and using the circular AOI as the AOI corresponding to the reference region.

In some embodiments, the geographic location information of the reference region reference region includes two sets of geographic coordinates of the reference region. The determining an Area of Interest (AOI) corresponding to the reference region on a map using the geographic location information of the reference region includes: finding respectively points indicated by the two sets of geographic coordinates of the reference region on the map; and circumscribing a rectangular AOI on the map with the points indicated by the two sets of geographic coordinates of the reference region as diagonal vertices, and using the rectangular AOI as the AOI corresponding to the reference region.

In some embodiments, the geographic location information of the reference region includes three or more sets of geographic coordinates of the reference region. The determining an Area of Interest (AOI) corresponding to the reference region on a map using the geographic location information of the reference region includes: finding respectively points indicated by the three or more sets of geographic coordinates of the reference region on the map; and connecting sequentially the points indicated by the three or more sets of geographic coordinates of the reference region on the map in a preset connecting order to form a polygonal AOI, and using the polygonal AOI as the AOI corresponding to the reference region.

In some embodiments, the dividing the AOI corresponding to the reference region into a plurality of candidate AOIs includes: dividing the AOI corresponding to the reference region into the plurality of candidate AOIs using a road and/or a boundary of a residential area on the map as a dividing line.

In some embodiments, the dividing the AOI corresponding to the reference region into a plurality of candidate AOIs includes: receiving dividing line information sent by the terminal device; and dividing the AOI corresponding to the reference region into the plurality of candidate AOIs based on the dividing line information.

In some embodiments, the statisticising respectively the people flow information and Point of Interest (POI) information of each candidate AOI of the plurality of candidate AOIs includes: collecting respectively a user location data set in the each candidate AOI of the plurality of candidate AOIs within a preset period of time; finding, in a prebuilt set of user profiles, a user profile of a user indicated by each piece of user location data in the user location data set in the each candidate AOI, wherein the user profile is user information including at least one type of descriptive tag and established according to pre-accumulated user data; calculating respectively a weight of the user indicated by the each piece of user location data in the user location data set in the each candidate AOI based on preset weights of various types of descriptive tags; and calculating respectively a people flow weight of the each candidate AOI based on the weight of the user indicated by the each piece of user location data in the user location data set in the each candidate AOI.

In some embodiments, the statisticising respectively the people flow information and Point of Interest (POI) information of each candidate AOI of the plurality of candidate AOIs further includes: statisticising respectively POI data of each candidate AOI of the plurality of candidate AOIs on the map, wherein the POI data includes a POI name and a POI type; and calculating respectively a POI weight of the each candidate AOI based on preset weights of various POI types.

In some embodiments, the selecting a candidate AOI as a target AOI from the plurality of candidate AOIs based on the people flow information and the POI information of the each candidate AOI includes: calculating respectively a total weight of the each candidate AOI based on the people flow weight and the POI weight of the each candidate AOI; and selecting the candidate AOI as the target AOI from the plurality of candidate AOIs based on the total weight of the each candidate AOI.

In a second aspect, the embodiments of the present disclosure provide an apparatus for pushing information, the apparatus including: a receiving unit, configured to receive geographic location information of a reference region sent by a terminal device; a determining unit, configured to determine an Area of Interest (AOI) corresponding to the reference region on a map using the geographic location information of the reference region; a dividing unit, configured to divide the AOI corresponding to the reference region into a plurality of candidate AOIs; and a statisticising unit, configured to statisticise respectively people flow information and Point of Interest (POI) information of each candidate AOI of the plurality of candidate AOIs; and a selecting unit, configured to select a candidate AOI as a target AOI from the plurality of candidate AOIs based on the people flow information and the POI information of the each candidate AOI, and push information of the target AOI to the terminal device.

In some embodiments, the geographic location information of the reference region includes one set of geographic coordinates of the reference region and a radius of the reference region. The determining unit is further configured to find a point indicated by the one set of geographic coordinates of the reference region on the map; and circle a circular AOI on the map with the point indicated by the one set of geographic coordinates of the reference region as a center of the circular AOI and with the radius of the reference region as a radius of the circular AOI, and use the circular AOI as the AOI corresponding to the reference region.

In some embodiments, the geographic location information of the reference region includes two sets of geographic coordinates of the reference region. The determining unit is further configured to find respectively points indicated by the two sets of geographic coordinates of the reference region on the map; and circumscribe a rectangular AOI on the map with the points indicated by the two sets of geographic coordinates of the reference region as diagonal vertices, and use the rectangular AOI as the AOI corresponding to the reference region.

In some embodiments, the geographic location information of the reference region includes three or more sets of geographic coordinates of the reference region. The determining unit is further configured to find respectively points indicated by the three or more sets of geographic coordinates of the reference region on the map; and connect sequentially the points indicated by the three or more sets of geographic coordinates of the reference region on the map in a preset connecting order to form a polygonal AOI, and use the polygonal AOI as the AOI corresponding to the reference region.

In some embodiments, the dividing unit is further configured to divide the AOI corresponding to the reference region into the plurality of candidate AOIs using a road and/or a boundary of a residential area on the map as a dividing line.

In some embodiments, the dividing unit is further configured to receive dividing line information sent by the terminal device; and divide the AOI corresponding to the reference region into the plurality of candidate AOIs based on the dividing line information.

In some embodiments, the statisticising unit includes: a collecting subunit, configured to collect respectively a user location data set in the each candidate AOI of the plurality of candidate AOIs within a preset period of time; and a finding subunit, configured to find, in a prebuilt set of user profiles, a user profile of a user indicated by each piece of user location data in the user location data set in the each candidate AOI. The user profile is user information including at least one type of descriptive tag and established according to pre-accumulated user data. The statisticising unit includes a first calculating subunit, configured to calculate respectively a weight of the user indicated by the each piece of user location data in the user location data set in the each candidate AOI based on preset weights of various types of descriptive tags; and a second calculating subunit, configured to calculate respectively a people flow weight of the each candidate AOI based on the weight of the user indicated by the each piece of user location data in the user location data set in the each candidate AOI.

In some embodiments, the statisticising unit further includes: a statisticising subunit, configured to statisticise respectively POI data of the each candidate AOI of the plurality of candidate AOIs on the map, wherein the POI data includes a POI name and a POI type; and a third calculating subunit, configured to calculate respectively a POI weight of the each candidate AOI based on preset weights of various POI types.

In some embodiments, the selecting unit includes a fourth calculating subunit, configured to calculate respectively a total weight of each candidate AOI based on the people flow weight and the POI weight of the each candidate AOI; and a selecting subunit, configured to select the candidate AOI as the target AOI from the plurality of candidate AOIs based on the total weight of the each candidate AOI.

In a third aspect, the embodiments of the present disclosure provide a server. The server includes: one or more processors; and a storage device configured to store one or more programs, the one or more programs, when executed by the one or more processors, causing the one or more processors to implement the method as described in any implementation in the first aspect.

In a fourth aspect, the embodiments the present disclosure provide a computer readable storage medium storing a computer program. The computer program, when executed by a processor, implements the method as described in any implementation in the first aspect.

According to the method and apparatus for pushing information provided by the embodiments of the present disclosure, first, the AOI corresponding to the reference region is determined on the map using the geographic location information of the reference region received from the terminal device. Next, the AOI corresponding to the reference region is divided into the plurality of candidate AOIs, and the people flow information and POI information of each candidate AOI are respectively counted. Finally, the candidate AOI is selected as the target AOI from the plurality of candidate AOIs based on the people flow information and POI information of each candidate AOI, and the information of the target AOI is pushed to the terminal device. By automatically acquiring the people flow information and POI information of each candidate AOI, the quick selection for the target AOI is achieved. There is no need for a field trip taken by people in the whole process, which reduces costs of acquiring information.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
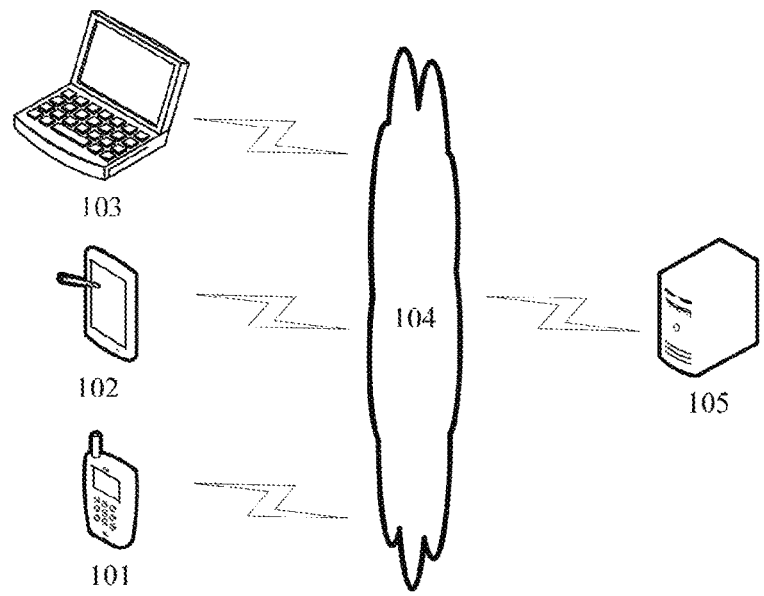
FIG. 1 is an exemplary system architecture diagram in which embodiments of the present disclosure may be applied.

FIG. 1 shows an exemplary architecture of a system 100 which may be used by a method for pushing information or a apparatus for pushing information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. For example, the user may use the terminal devices 101, 102 and 103 to send geographic location information of a reference region to the server 105 through the network 104; the user may also use the terminal devices 101, 102 and 103 to receive information of a target Area of Interest (AOI) from the server 105 through the network 104.

The terminal devices 101, 102 and 103 may be various electronic devices having display screens and supporting information browsing, including but not limited to, smart phones, tablet computers, laptop computers and desktop computers.

The server 105 may be a server providing various services, for example, a backend server that supports for information of the target AOI displayed on the terminal devices 101, 102 or 103. The backend server may perform a corresponding processing on data including geographic location information of the reference region, and return a processing result (for example, information of the target AOI) to the terminal devices 101, 102 and 103.

It should be noted that the method for pushing information according to the embodiments of the present disclosure is generally executed by the server 105. Accordingly, an apparatus for pushing information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
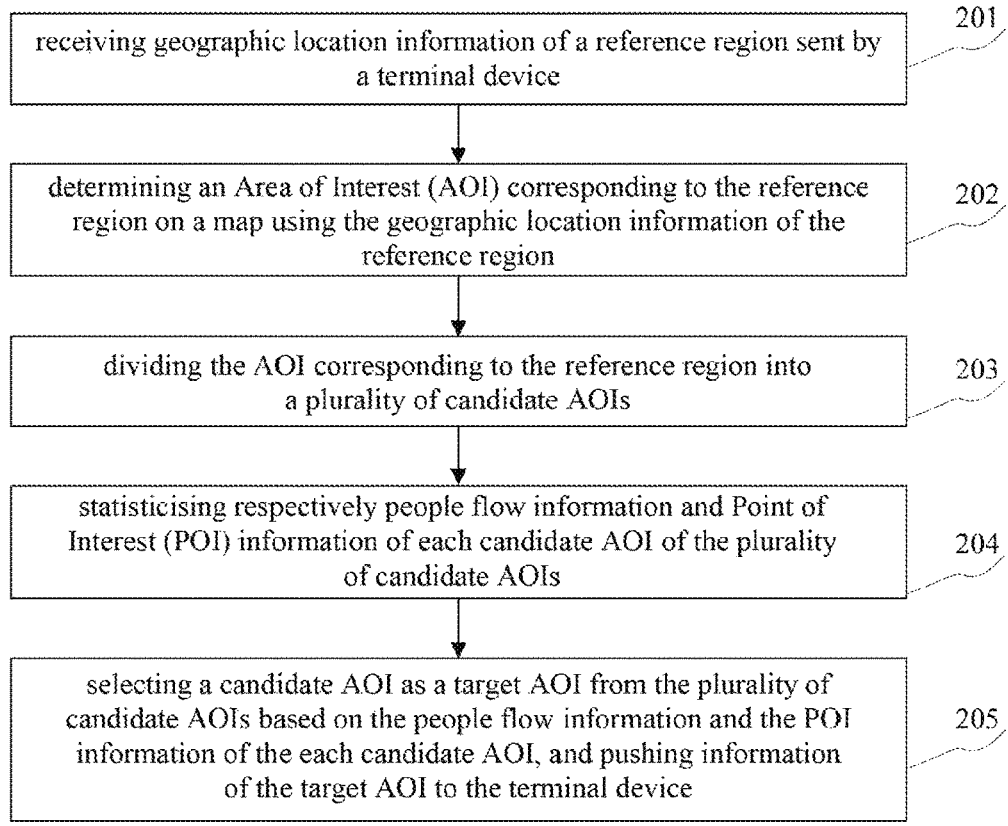
FIG. 2 is a flowchart of an embodiment of a method for pushing information according to the present disclosure.

Further referring to FIG. 2, FIG. 2 illustrates a flow 200 of an embodiment of a method for pushing information according to the present disclosure. The method for pushing information includes the following steps.

Step 201, receiving geographic location information of a reference region sent by a terminal device.

In this embodiment, an electronic device (e.g., the server 105 as illustrated in FIG. 1) on which the method for pushing information is performed may receive the geographic location information of the reference region from the terminal device (e.g., the terminal devices 101, 102 and 103 as illustrated in FIG. 1) by means of a wired connection or a wireless connection. The geographic location information of the reference region may include, but is not limited to, geographic coordinates of the reference region, an area of the reference region, a shape of the reference region, and the like. The geographic coordinates of the reference region may be spherical coordinates of locations of ground points indicated by longitudes and latitudes of the reference region.

Step 202, determining an Area of Interest (AOI) corresponding to the reference region on a map using the geographic location information of the reference region.

In this embodiment, based on the geographic location information of the reference region received in step 201, the electronic device may determine the AOI corresponding to the reference region on the map. The AOI may be a region-shaped geographic entity in the map.

In some alternative implementations of this embodiment, if the geographic location information of the reference region includes one set of geographic coordinates of the reference region and a radius of the reference region, the electronic device may first find a point indicated by the one set of geographic coordinates of the reference region on the map. The electronic device may then circle a circular AOI on the map with the point indicated by the one set of geographic coordinates of the reference region as a center of the circular AOI and with the radius of the reference region as a radius of the circular AOI, and use the circular AOI as the AOI corresponding to the reference region. As an example, if a set of geographic coordinates of the center of the reference region is (116° 24'17", 39° 44'27") and the radius of the reference region is 1 kilometer, the electronic device may circle a circular AOI on the map with the point indicated by (116° 24'17", 39° 44'27") as the center of the circular AOI and with 1 kilometer as the radius of the circular AOI, and use the circular AOI as the AOI corresponding to the reference region.

In some alternative implementations of this embodiment, if the geographic location information of the reference region includes two sets of geographic coordinates of the reference region, the electronic device may respectively find points indicated by the two sets of geographic coordinates of the reference region on the map. Then, the electronic device may circumscribe a rectangular AOI on the map with the two points indicated by the two sets of geographic coordinates of the reference region as diagonal vertices, and use the rectangular AOI as the AOI corresponding to the reference region. As an example, if geographic coordinates of the diagonal vertices of the reference region are (116° 24'17", 39° 44'27") and (116° 24'43", 39° 44'53"), the electronic device may first acquire geographic coordinates of other diagonal vertices (116° 24'17", 39° 44'53") and (116° 24'43", 39° 44'27"), then sequentially connect points indicated by the geographic coordinates of the four vertices of the reference region on the map to form a rectangular AOI, and use the rectangular AOI as the AOI corresponding to the reference region.

In some alternative implementations of this embodiment, if the geographic location information of the reference region includes three or more sets of geographic coordinates of the reference region, first, the electronic device may respectively find points indicated by the three or more sets of geographic coordinates of the reference region on the map. Then, the electronic device may sequentially connect the points indicated by the three or more sets of geographic coordinates of the reference region on the map in a preset connecting order, to form a polygonal AOI, and use the polygonal AOI as the AOI corresponding to the reference region. As an example, if the geographic location information of the reference region includes five sets of geographic coordinates of the reference region, the electronic device may connect points indicated by the five sets of geographic coordinates of the reference region clockwise or counterclockwise, to form a pentagonal AOI, and use the pentagonal AOI as the AOI corresponding to the reference region.

Step 203, dividing the AOI corresponding to the reference region into a plurality of candidate AOIs.

In this embodiment, based on the AOI corresponding to the reference region determined in step 202, the electronic device may divide the AOI corresponding to the reference region into the plurality of candidate AOIs.

In some alternative implementations of this embodiment, the electronic device may divide the AOI corresponding to the reference region into the plurality of candidate AOIs using a road and/or a boundary of a residential area on the map as a dividing line.

In some alternative implementations of this embodiment, the electronic device may first receive dividing line information sent by the terminal device, and then divide the AOI corresponding to the reference region into the plurality of candidate AOIs based on the dividing line information. As an example, in a situation where the dividing line information indicates that the reference region is to be divided into four equal candidate AOIs having the same area, if the AOI corresponding to the reference region is circular, the electronic device may divide the AOI corresponding to the reference region into four sectors having the same area. If the AOI corresponding to the reference region is rectangular, the electronic device may divide the AOI corresponding to the reference region into four little rectangles having the same area.

Step 204, statisticising respectively people flow information and Point of Interest (POI) information of each candidate AOI of the plurality of candidate AOIs.

In this embodiment, based on the plurality of candidate AOIs divided in step 203, the electronic device may respectively statisticise the people flow information and POI (point of interest) information of each candidate AOI of the plurality of candidate AOIs. The people flow information may include, but is not limited to, a people flow rate, a people flow type, a people flow weight, etc. The POI information may include, but is not limited to, a number of POIs and a POI type. The POI may be a landmark point on the map used to indicate places such as commercial organizations from all walks of life (e.g., a gas station, a department store, a supermarket, a restaurant, a hotel, a convenience store and a hospital), tourist spots (e.g., a park and a public toilet), transportation facilities (e.g., various stations, a parking lot, a speed camera, a speed limit sign).

In some alternative implementations of this embodiment, in a situation where the people flow information is the people flow rate, the electronic device may statisticise a people flow rate of each candidate AOI through the following steps.

First, the electronic device may respectively collect a user location data set in each candidate AOI within a preset period of time (e.g., one week, one month or one quarter).

Herein, a mobile phone used by a user may acquire positioning data of the user by a mobile phone positioning technique. A map application installed in the mobile phone used by the user may also acquire the positioning data of the user.

Next, the electronic device may respectively acquire a user identifier set corresponding to the user location data set in each candidate AOI.

Herein, the positioning data of the user may include a user identifier. The user identifier is composed of numbers, letters, symbols, etc., and may be used to uniquely identify the user. For example, the user identifier may be an International Mobile Subscriber Identification Number (IMSI) of the mobile phone used by the user or an account assigned when the user registers the map application.

Then, the electronic device may respectively statisticise a number of user identifiers included in each user identifier set, and use the number of user identifiers included in each user identifier set as the people flow rate of each candidate AOI.

In some alternative implementations of this embodiment, in a situation where the POI information is the number of POIs, the electronic device may respectively statisticise a number of POIs of each candidate AOI of the plurality of candidate AOIs on the map.

Step 205, selecting a candidate AOI as a target AOI from the plurality of candidate AOIs based on the people flow information and the POI information of the each candidate AOI, and pushing information of the target AOI to the terminal device.

In this embodiment, based on the people flow information and POI information of each candidate AOI counted in step 204, the electronic device may select the candidate AOI as the target AOI from the plurality of candidate AOIs, and push the information of the target AOI to the terminal device. The information of the target AOI may include, but is not limited to, geographic coordinates of the target AOI, people flow information of the target AOI, and POI information of the target AOI. Generally, the larger the people flow rate and the number of POIs of the candidate AOI are, the higher the probability of the candidate AOI being selected as the target AOI is.

In the method for pushing information provided by this embodiment according to the present disclosure, first, the AOI corresponding to the reference region is determined on the map using the geographic location information of the reference region received from the terminal device. Next, the AOI corresponding to the reference region is divided into the plurality of candidate AOIs, and the people flow information and POI information of each candidate AOI are respectively counted. Finally, the target AOI is selected from the plurality of candidate AOIs based on the people flow information and POI information of each candidate AOI, and the information of the target AOI is pushed to the terminal device. By automatically acquiring the people flow information and POI information of each candidate AOI, the quick selection for the target AOI is achieved. There is no need for a field trip taken by people in the whole process, which reduces costs of acquiring information.

Figure 3:
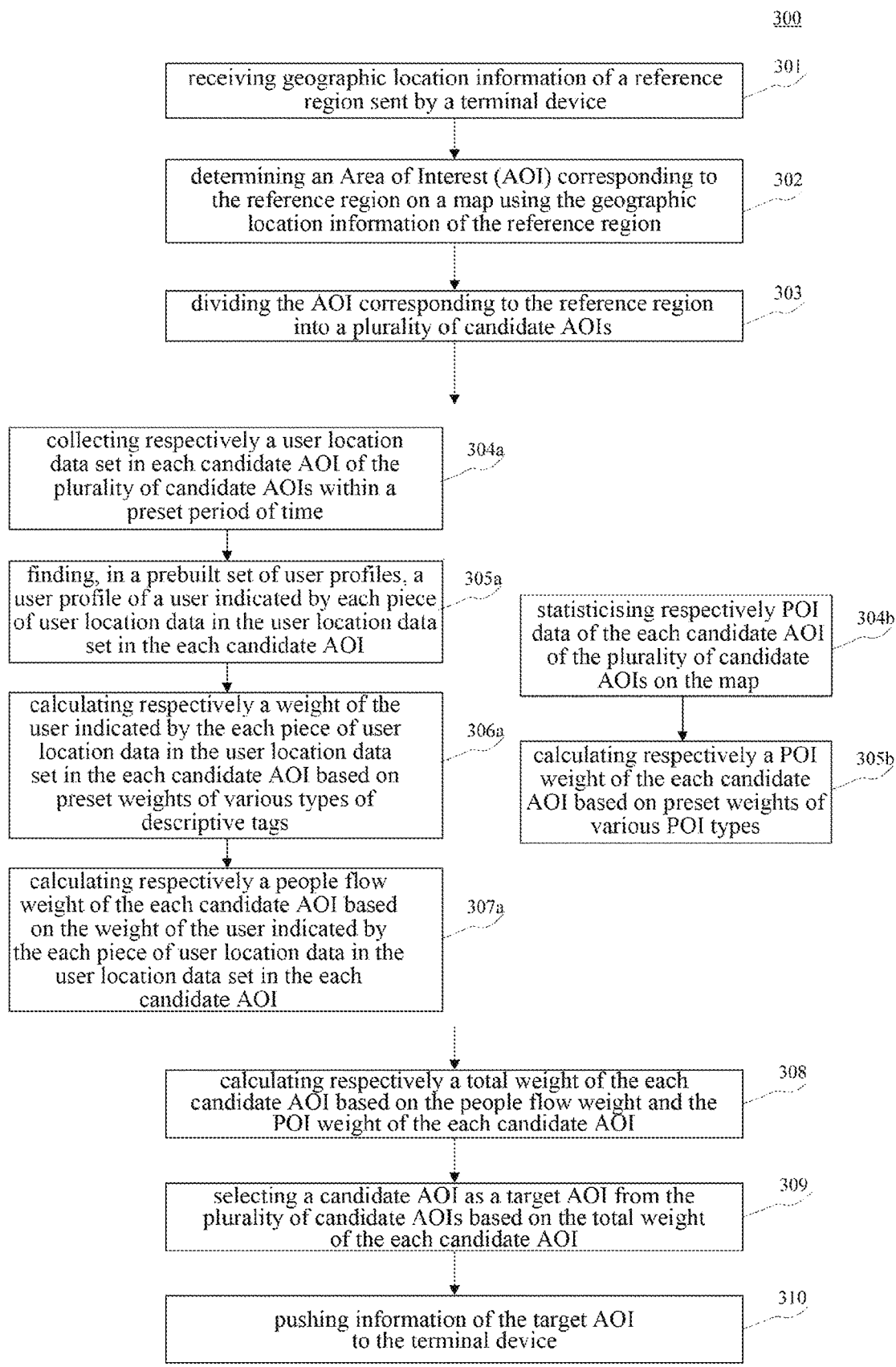
FIG. 3 is a flowchart of another embodiment of the method for pushing information according to the present disclosure.

Further referring to FIG. 3, FIG. 3 illustrates a flow 300 of another embodiment of the method for pushing information. The flow 300 of the method for pushing information includes the following steps.

Step 301, receiving geographic location information of a reference region sent by a terminal device.

In this embodiment, an electronic device (e.g., the server 105 as illustrated in FIG. 1) on which the method for pushing information is performed may receive the geographic location information of the reference region from the terminal device (e.g., the terminal devices 101, 102 and 103 as illustrated in FIG. 1) by means of wired connection or wireless connection.

Step 302, determining an Area of Interest (AOI) corresponding to the reference region on a map using the geographic location information of the reference region.

In this embodiment, based on the geographic location information of the reference region received in step 301, the electronic device may determine the AOI corresponding to the reference region on the map.

Step 303, dividing the AOI corresponding to the reference region into a plurality of candidate AOIs.

In this embodiment, based on the AOI corresponding to the reference region determined in step 302, the electronic device may divide the AOI corresponding to the reference region into the plurality of candidate AOIs, and keep performing step 304a and step 304b.

Step 304a, collecting respectively a user location data set in each candidate AOI of the plurality of candidate AOIs within a preset period of time.

In this embodiment, based on the plurality of candidate AOIs divided in step 303, the electronic device may respectively collect the user location data set in each candidate AOI within the preset period of time (e.g., one week, one month, or one quarter).

Step 305a, finding, in a prebuilt set of user profiles, a user profile of a user indicated by each piece of user location data in the user location data set in the each candidate AOI.

In this embodiment, based on the user location data set in the each candidate AOI collected in step 304a, the electronic device may find the user profile of the user indicated by each piece of user location data in the user location data set in the each candidate AOI in the prebuilt set of user profiles. The user profile is user information including at least one type of descriptive tag and established according to pre-accumulated user data. The descriptive tag may be used to describe the gender of the user, the income status of the user, the residential area of the user, the workplace of the user, various hobbies of the user, etc. As an example, the user profile may be "male, 31 years old, resident population, having the income of more than 10,000, loving food, and liking fitness."

Step 306a, calculating respectively a weight of the user indicated by the each piece of user location data in the user location data set in the each candidate AOI based on preset weights of various types of descriptive tags.

In this embodiment, based on the user profile of the user indicated by each piece of user location data in the user location data set in each candidate AOI found out in step 305a and the preset weights of various types of descriptive tags, the electronic device may respectively calculate the weight of the user indicated by each piece of user location data in the user location data set in each candidate AOI. Specifically, the electronic device may first find the weights of various types of descriptive tags in the user profile; and then sum over the weights of the various types of descriptive tags in the user profile and use the acquired sum as the weight of the user. As an example, if a weight corresponding to an age of the user below 60 years old is 0.3, a weight of liking fitness of the user is 0.4, and a weight of belonging to the resident population of the user is 0.5, for the user having the user profile "male, 31 years old, resident population, having the income of more than 10,000, loving food, and liking fitness," the weight of the user is 1.2.

Step 307a, calculating respectively a people flow weight of the each candidate AOI based on the weight of the user indicated by the each piece of user location data in the user location data set in the each candidate AOI.

In this embodiment, based on the weight of the user indicated by each piece of user location data in the user location data set in each candidate AOI calculated in step 306a, the electronic device may respectively calculate the people flow weight of each candidate AOI. As an example, the electronic device may sum over the weight of the user indicated by each piece of user location data in the user location data set in each candidate AOI, and use the acquired sum as the people flow weight of the candidate AOI.

Step 304b, statisticising respectively POI data of the each candidate AOI of the plurality of candidate AOIs on the map.

In this embodiment, based on the plurality of candidate AOIs divided in step 303, the electronic device may respectively statisticise the POI data of the each candidate AOI. The POI data may include a POI name and a POI type. The POI type may include a competitive type and a matching type. A POI of the competitive type is a place of the same type as that of a to-be-constructed place. A POI of the matching type is a place playing a supporting role to the to-be-constructed place.

Step 305b, calculating respectively a POI weight of the each candidate AOI based on preset weights of various POI types.

In this embodiment, based on the POI data of each candidate AOI counted in step 304b and the preset weights of various POI types, the electronic device may respectively calculate the POI weight of each candidate AOI. Specifically, the electronic device may first find a number of POIs of the competitive type and a number of POIs of the matching type in the candidate AOI; then multiply the number of POIs of the competitive type and a weight of the competitive type, and multiply the number of POIs of the matching type and a weight of the matching type; and finally use a difference between the two acquired products as the POI weight of the candidate AOI. As an example, if a weight of the competitive type is 0.5, and a weight of the matching type is 0.2, for a candidate AOI having 2 POIs of the competitive type and 10 POIs of the matching type, the POI weight of the candidate AOI is 1.

Step 308, calculating respectively a total weight of the each candidate AOI based on the people flow weight and the POI weight of the each candidate AOI.

In this embodiment, based on the people flow weight of each candidate AOI calculated in step 307a and the POI weight of each candidate AOI calculated in step 305b, the electronic device may respectively calculate the total weight of each candidate AOI.

In some alternative implementations of this embodiment, the electronic device may preset different parameters for the people flow weight and the POI weight; then multiply the people flow weight and its corresponding parameter, and multiply the POI weight and its corresponding parameter; and finally use a sum of the two acquired products as the total weight of the candidate AOI.

Step 309, selecting a candidate AOI as a target AOI from the plurality of candidate AOIs based on the total weight of the each candidate AOI.

In this embodiment, based on the total weight of each candidate AOI calculated in step 308, the electronic device may select the candidate AOI as the target AOI from the candidate AOIs. In general, the larger the total weight of the candidate AOI is, the higher the probability of this candidate AOI being selected as the target AOI is.

Step 310, pushing information of the target AOI to the terminal device.

It may be seen from FIG. 3 that, as compared with the embodiment corresponding to FIG. 2, the flow 300 of the method for pushing information in this embodiment emphasizes the step of statisticising the people flow information and POI information of the candidate AOI. Accordingly, the people flow information and POI information of the candidate AOI in the solution described in this embodiment are more objective and comprehensive, so that the target AOI selected based on the people flow information and POI information of the candidate AOI is more reliable.

Figure 4:
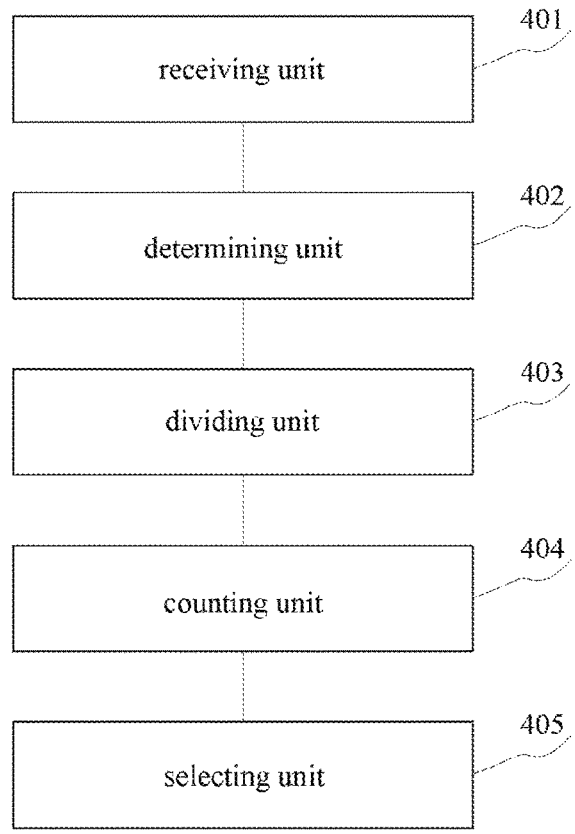
FIG. 4 is a schematic structural diagram of an embodiment of an apparatus for pushing information according to the present disclosure.

Further referring to FIG. 4, as an implementation of the method shown in the above drawings, the present disclosure provides an embodiment of an apparatus for pushing information. The embodiment of this apparatus corresponds to the embodiment of the method as illustrated in FIG. 2, and the apparatus may be applied in various electronic devices.

As shown in FIG. 4, the apparatus for pushing information 400 in this embodiment may include: a receiving unit 401, a determining unit 402, a dividing unit 403, a statisticising unit 404 and a selecting unit 405. The receiving unit 401 is configured to receive geographic location information of a reference region sent by a terminal device. The determining unit 402 is configured to determine an Area of Interest (AOI) corresponding to the reference region on a map using the geographic location information of the reference region. The dividing unit 403 is configured to divide the AOI corresponding to the reference region into a plurality of candidate AOIs. The statisticising unit 404 is configured to statisticise respectively people flow information and Point of Interest (POI) information of each candidate AOI of the plurality of candidate AOIs. The selecting unit 405 is configured to select a candidate AOI as a target AOI from the plurality of candidate AOIs based on the people flow information and the POI information of the each candidate AOI, and push information of the target AOI to the terminal device.

In this embodiment, for specific processes of the receiving unit 401, the determining unit 402, the dividing unit 403, the statisticising unit 404 and the selecting unit 405 in the apparatus for pushing information 400, and their technical effects, reference may be made to relative descriptions of step 201, step 202, step 203, step 204 and step 205 in the corresponding embodiment of FIG. 2 respectively, which will not be repeatedly described here.

In some alternative implementations of this embodiment, the geographic location information of the reference region may include one set of geographic coordinates of the reference region and a radius of the reference region. The determining unit 402 may be further configured to find a point indicated by the one set of geographic coordinates of the reference region on the map; and circle a circular AOI on the map with the point indicated by the one set of geographic coordinates of the reference region as a center of the circular AOI and with the radius of the reference region as a radius of the circular AOI, and use the circular AOI as the AOI corresponding to the reference region.

In some alternative implementations of this embodiment, the geographic location information of the reference region may include two sets of geographic coordinates of the reference region. The determining unit 402 may be further configured to respectively find points indicated by the two sets of geographic coordinates of the reference region on the map; and circumscribe a rectangular AOI on the map with the points indicated by the two sets of geographic coordinates of the reference region as diagonal vertices, and use the rectangular AOI as the AOI corresponding to the reference region.

In some alternative implementations of this embodiment, the geographic location information of the reference region may include three or more sets of geographic coordinates of the reference region. The determining unit 402 may be further configured to respectively find points indicated by the three or more sets of geographic coordinates of the reference region on the map; and connect sequentially the points indicated by the three or more sets of geographic coordinates of the reference region on the map in a preset connecting order, to form a polygonal AOI, and use the polygonal AOI as the AOI corresponding to the reference region.

In some alternative implementations of this embodiment, the dividing unit 403 may be further configured to divide the AOI corresponding to the reference region into the plurality of candidate AOIs using a road and/or a boundary of a residential area on the map as a dividing line.

In some alternative implementations of this embodiment, the dividing unit 403 may be further configured to receive dividing line information sent by the terminal device; and divide the AOI corresponding to the reference region into the plurality of candidate AOIs based on the dividing line information.

In some alternative implementations of this embodiment, the statisticising unit 404 may include a collecting subunit (not shown in the drawings), configured to collect respectively a user location data set in each candidate AOI of the plurality of candidate AOIs within a preset period of time; and a finding subunit (not shown in the drawings), configured to find a user profile of a user indicated by each piece of user location data in the user location data set in the each candidate AOI in a prebuilt set of user profiles. The user profile is user information including at least one type of descriptive tag and established according to pre-accumulated user data. The statisticising unit 404 may include a first calculating subunit (not shown in the drawings), configured to calculate respectively a weight of the user indicated by the each piece of user location data in the user location data set in the each candidate AOI based on preset weights of various types of descriptive tags; and a second calculating subunit (not shown in the drawings), configured to calculate respectively a people flow weight of the each candidate AOI based on the weight of the user indicated by the each piece of user location data in the user location data set in the each candidate AOI.

In some alternative implementations of this embodiment, the statisticising unit 404 may further include a statisticising subunit (not shown in the drawings), configured to statisticise respectively POI data of the each candidate AOI of the plurality of candidate AOIs on the map, the POI data including a POI name and a POI type; and a third calculating subunit (not shown in the drawings), configured to calculate respectively a POI weight of the each candidate AOI based on preset weights of various POI types.

In some alternative implementations of this embodiment, the selecting unit 405 may include a fourth calculating subunit (not shown in the drawings), configured to calculate respectively a total weight of the each candidate AOI based on the people flow weight and the POI weight of the each candidate AOI; and a selecting subunit (not shown in the drawings), configured to select a candidate AOI as a target AOI from the plurality of candidate AOIs based on the total weight of the each candidate AOI.

Figure 5:
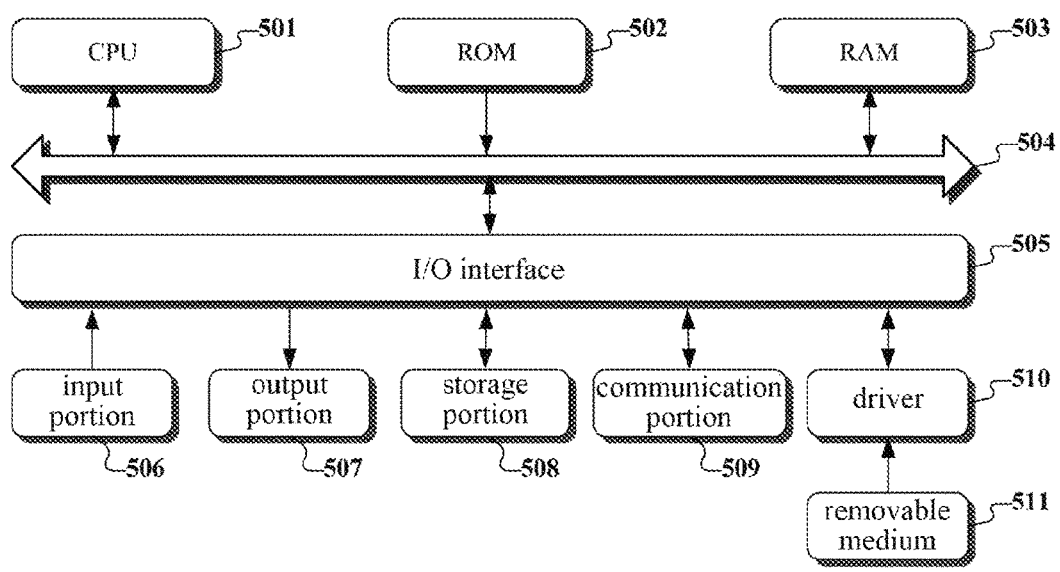
FIG. 5 is a schematic structural diagram of a computer system adapted to implement a server according to an embodiment of the present disclosure.

Referring to FIG. 5, a schematic structural diagram of a computer system 500 adapted to implement a server of the embodiments of the present disclosure is shown. The server shown in FIG. 5 is merely an example, but does not impose any restrictions on the function and scope of embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a receiving unit, a determining unit, a dividing unit, a statisticising unit and a selecting unit, where the names of these units or modules do not in some cases constitute a limitation to such units themselves. For example, the receiving unit may also be described as "a unit for receiving geographic location information of a reference region sent by a terminal device".

In another aspect, the present disclosure further provides a computer-readable storage medium. The computer-readable storage medium may be the computer storage medium included in the server in the above described embodiments, or a stand-alone computer-readable storage medium not assembled into the server. The computer-readable storage medium stores one or more programs. The one or more programs, when executed by a device, cause the device to:

receiving geographic location information of a reference region sent by a terminal device; determining an Area of Interest (AOI) corresponding to the reference region on a map using the geographic location information of the reference region; dividing the AOI corresponding to the reference region into a plurality of candidate AOIs; statisticising respectively people flow information and Point of Interest (POI) information of each candidate AOI of the plurality of candidate AOIs; and selecting a candidate AOI as a target AOI from the plurality of candidate AOIs based on the people flow information and the POI information of the each candidate AOI, and pushing information of the target AOI to the terminal device.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for pushing information, the method comprising:
    receiving geographic location information of a reference region sent by a terminal device;
    determining an Area of Interest (AO') corresponding to the reference region on a map using the geographic location information of the reference region;
    dividing the AOI corresponding to the reference region into a plurality of candidate AOIs;
    statisticising respectively people flow information and Point of Interest (POI) information of each candidate AOI of the plurality of candidate AOIs; and
    selecting a candidate AOI as a target AOI from the plurality of candidate AOIs based on the people flow information and the POI information of the each candidate AOI, and pushing information of the target AOI to the terminal device;
    wherein the statisticising respectively people flow information and Point of Interest (POI) information of each candidate AOI of the plurality of candidate AOIs comprises:
    collecting respectively a user location data set in the each candidate AOI of the plurality of candidate AOIs within a preset period of time;
    finding, in a prebuilt set of user profiles, a user profile of a user indicated by each piece of user location data in the user location data set in the each candidate AOI, wherein the user profile is user information comprising at least one type of descriptive tag and established according to pre-accumulated user data;
    calculating respectively a weight of the user indicated by the each piece of user location data in the user location data set in the each candidate AOI based on preset weights of various types of descriptive tags; and
    calculating respectively a people flow weight of the each candidate AOI based on the weight of the user indicated by the each piece of user location data in the user location data set in the each candidate AOI.

2. The method according to claim 1, wherein the geographic location information of the reference region comprises one set of geographic coordinates of the reference region and a radius of the reference region; and
    the determining an Area of Interest (AOI) corresponding to the reference region on a map using the geographic location information of the reference region comprises:
        finding a point indicated by the one set of geographic coordinates of the reference region on the map; and
        circling a circular AOI on the map with the point indicated by the one set of geographic coordinates of the reference region as a center of the circular AOI and with the radius of the reference region as a radius of the circular AOI, and using the circular AOI as the AOI corresponding to the reference region.

3. The method according to claim 1, wherein the geographic location information of the reference region comprises two sets of geographic coordinates of the reference region; and
    the determining an Area of Interest (AOI) corresponding to the reference region on a map using the geographic location information of the reference region comprises:
        finding respective points indicated by the two sets of geographic coordinates of the reference region on the map; and
        circumscribing a rectangular AOI on the map with the points indicated by the two sets of geographic coordinates of the reference region as diagonal vertices, and using the rectangular AOI as the AOI corresponding to the reference region.

4. The method according to claim 1, wherein the geographic location information of the reference region comprises three or more sets of geographic coordinates of the reference region; and
    the determining an Area of Interest (AOI) corresponding to the reference region on a map using the geographic location information of the reference region comprises:
        finding respectively points indicated by the three or more sets of geographic coordinates of the reference region on the map; and
        connecting sequentially the points indicated by the three or more sets of geographic coordinates of the reference region on the map in a preset connecting order, to form a polygonal AOI, and using the polygonal AOI as the AOI corresponding to the reference region.

5. The method according to claim 1, wherein the dividing the AOI corresponding to the reference region into a plurality of candidate AOIs comprises:
    dividing the AOI corresponding to the reference region into the plurality of candidate AOIs using a road and/or a boundary of a residential area on the map as a dividing line.

6. The method according to claim 1, wherein the dividing the AOI corresponding to the reference region into a plurality of candidate AOIs comprises:
    receiving dividing line information sent by the terminal device; and
    dividing the AOI corresponding to the reference region into the plurality of candidate AOIs based on the dividing line information.

7. The method according to claim 1, wherein the statisticising respectively the people flow information and Point of Interest (POI) information of each candidate AOI of the plurality of candidate AOIs further comprises:

statisticising respectively POI data of the each candidate AOI of the plurality of candidate AOIs on the map, wherein the POI data comprises a POI name and a POI type; and calculating respectively a POI weight of the each candidate AOI based on preset weights of various POI types.

8. The method according to claim 7, wherein the selecting a candidate AOI as a target AOI from the plurality of candidate AOIs based on the people flow information and the POI information of the each candidate AOI comprises:

calculating respectively a total weight of the each candidate AOI based on the people flow weight and the POI weight of the each candidate AOI; and selecting the candidate AOI as the target AOI from the plurality of candidate AOIs based on the total weight of the each candidate AOI.

9. An apparatus for pushing information, the apparatus comprising:

at least one processor; and a memory storing instructions, the instructions when executed by the at least one processor, cause the at least one processor to perform operations, the operations comprising:

receiving geographic location information of a reference region sent by a terminal device;

determining an Area of Interest (AO') corresponding to the reference region on a map using the geographic location information of the reference region;

dividing the AOI corresponding to the reference region into a plurality of candidate AOIs; and statisticising respectively people flow information and Point of Interest (POI) information of each candidate AOI of the plurality of candidate AOIs; and selecting a candidate AOI as a target AOI from the plurality of candidate AOIs based on the people flow information and the POI information of the each candidate AOI, and pushing information of the target AOI to the terminal device;

wherein the statisticising respectively people flow information and Point of Interest (POI) information of each candidate AOI of the plurality of candidate AOIs comprises:

collecting respectively a user location data set in the each candidate AOI of the plurality of candidate AOIs within a preset period of time;

finding, in a prebuilt set of user profiles, a user profile of a user indicated by each piece of user location data in the user location data set in the each candidate AOI, wherein the user profile is user information comprising at least one type of descriptive tag and established according to pre-accumulated user data;

calculating respectively a weight of the user indicated by the each piece of user location data in the user location data set in the each candidate AOI based on preset weights of various types of descriptive tags; and calculating respectively a people flow weight of the each candidate AOI based on the weight of the user indicated by the each piece of user location data in the user location data set in the each candidate AOI.

10. The apparatus according to claim 9, wherein the statisticising respectively the people flow information and Point of Interest (POI) information of each candidate AOI of the plurality of candidate AOIs further comprises:

statisticising respectively POI data of the each candidate AOI of the plurality of candidate AOIs on the map, wherein the POI data comprises a POI name and a POI type; and calculating respectively a POI weight of the each candidate AOI based on preset weights of various POI types.

11. The apparatus according to claim 10, wherein the selecting a candidate AOI as a target AOI from the plurality of candidate AOIs based on the people flow information and the POI information of the each candidate AOI comprises:

calculating respectively a total weight of the each candidate AOI based on the people flow weight and the POI weight of each candidate AOI; and selecting the candidate AOI as the target AOI from the plurality of candidate AOIs based on the total weight of the each candidate AOI.

12. A non-transitory computer storage medium storing a computer program, the computer program when executed by one or more processors, causes the one or more processors to perform operations, the operations comprising:

receiving geographic location information of a reference region sent by a terminal device;

determining an Area of Interest (AOI) corresponding to the reference region on a map using the geographic location information of the reference region;

dividing the AOI corresponding to the reference region into a plurality of candidate AOIs;

statisticising respectively people flow information and Point of Interest (POI) information of each candidate AOI of the plurality of candidate AOIs; and selecting a candidate AOI as a target AOI from the plurality of candidate AOIs based on the people flow information and the POI information of the each candidate AOI, and pushing information of the target AOI to the terminal device;

wherein the statisticising respectively people flow information and Point of Interest (POI) information of each candidate AOI of the plurality of candidate AOIs comprises:

collecting respectively a user location data set in the each candidate AOI of the plurality of candidate AOIs within a preset period of time;

finding, in a prebuilt set of user profiles, a user profile of a user indicated by each piece of user location data in the user location data set in the each candidate AOI, wherein the user profile is user information comprising at least one type of descriptive tag and established according to pre-accumulated user data;

calculating respectively a weight of the user indicated by the each piece of user location data in the user location data set in the each candidate AOI based on preset weights of various types of descriptive tags; and calculating respectively a people flow weight of the each candidate AOI based on the weight of the user indicated by the each piece of user location data in the user location data set in the each candidate AOI.

* * * * *

UNITED STATES PATENT AND TRADEMARK OFFICE
CERTIFICATE OF CORRECTION

PATENT NO. : 10,587,711 B2
APPLICATION NO. : 16/026704
DATED : March 10, 2020
INVENTOR(S) : Xuang Fan Page 1 of 1

It is certified that error appears in the above-identified patent and that said Letters Patent is hereby corrected as shown below:

In the Claims

Column 15, Claim 1, Line 34:
"determining an Area of Interest (AO') corresponding to"
Should read:
--determining an Area of Interest (AOI) corresponding to--.

Column 17, Claim 9, Line 26:
"determining an Area of Interest (AO') corresponding to"
Should read:
--determining an Area of Interest (AOI) corresponding to--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*